United States Patent
Tischler

[11] 3,844,309
[45] Oct. 29, 1974

[54] BRINE VALVE ASSEMBLY

[75] Inventor: Edward Joseph Tischler, St. Paul, Minn.

[73] Assignee: Ecodyne Corporation, Chicago, Ill.

[22] Filed: Nov. 16, 1973

[21] Appl. No.: 416,708

[52] U.S. Cl.................. 137/399, 210/119, 73/322.5
[51] Int. Cl............................................. F16k 31/22
[58] Field of Search .......... 137/386, 389, 391, 399, 137/429, 430, 433, 431; 210/119; 73/322.5

[56] References Cited
UNITED STATES PATENTS

| | | | |
|---|---|---|---|
| 2,695,626 | 11/1954 | Riche | 137/391 |
| 3,126,907 | 3/1964 | Tischler et al. | 137/399 |
| 3,211,170 | 10/1965 | White | 137/391 |

Primary Examiner—William R. Cline
Assistant Examiner—David R. Matthews
Attorney, Agent, or Firm—Joel E. Siegal; Charles M. Kaplan

[57] ABSTRACT

An improved brine valve assembly for control of the brine used to regenerate ion exchange material. The brine valve assembly includes a float valve arrangement for closing and sealing the inlet port when a predetermined low level is reached in the brine tank. The float valve is positioned to float within a float cage immediately prior to its sealing of the inlet port. The level of liquid within the cage is controlled through a tube having a lower end in communication therewith and an upper end in communication with the interior of the brine tank. The elevation of the upper end is adjustable to control the amount of brine drawn during each regeneration cycle. An alternative embodiment of the invention discloses a unique float construction which uses the weight of the brine to insure a better air shut-off.

5 Claims, 6 Drawing Figures

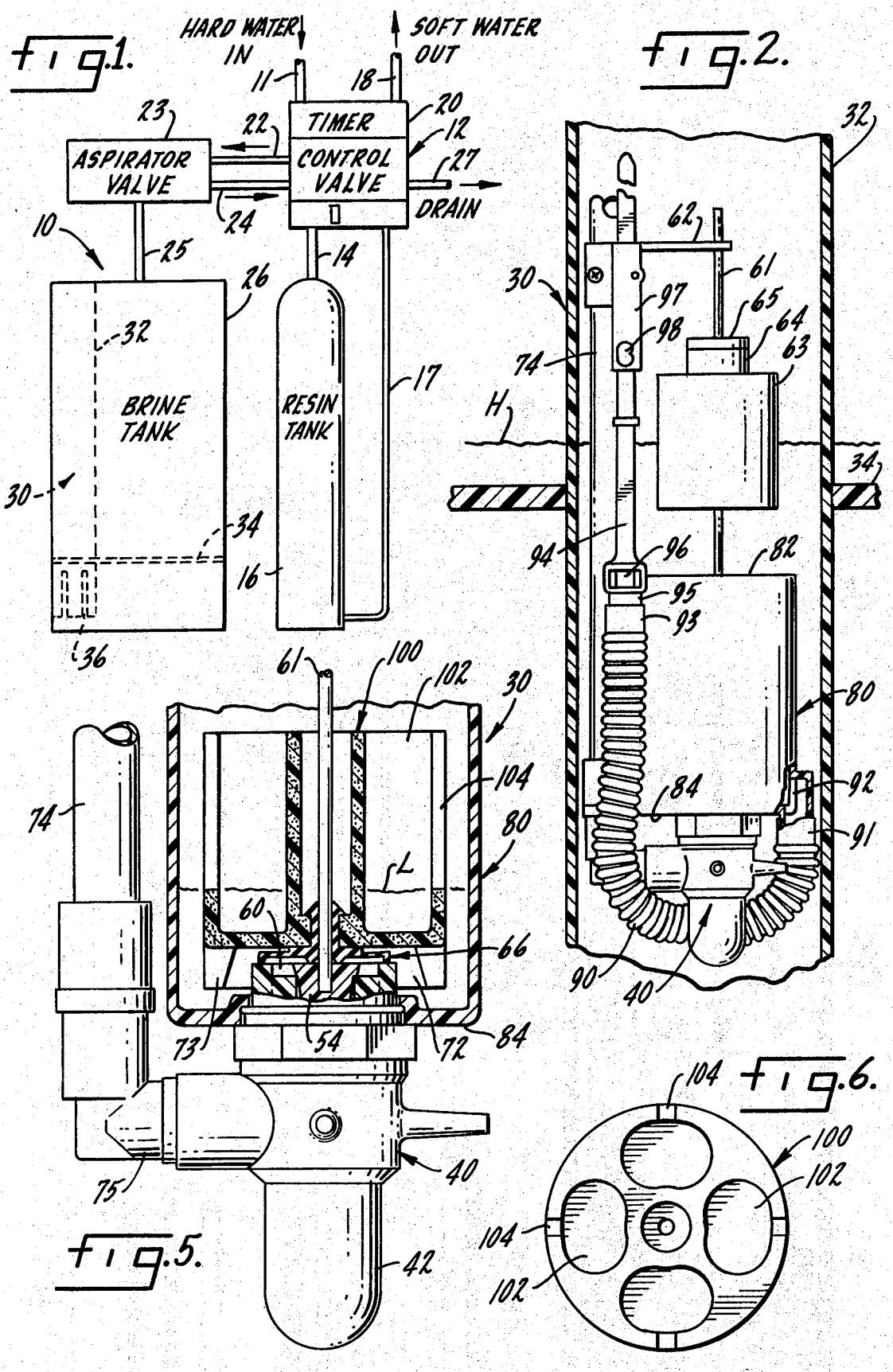

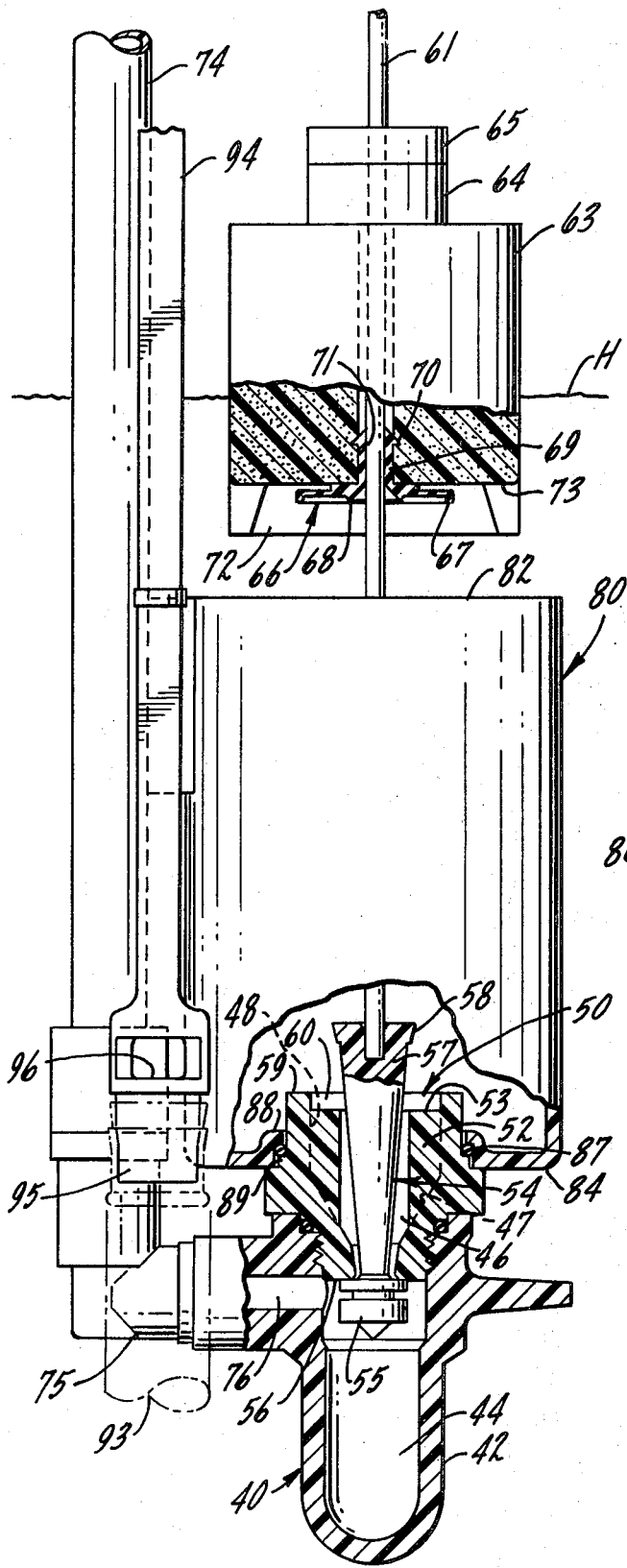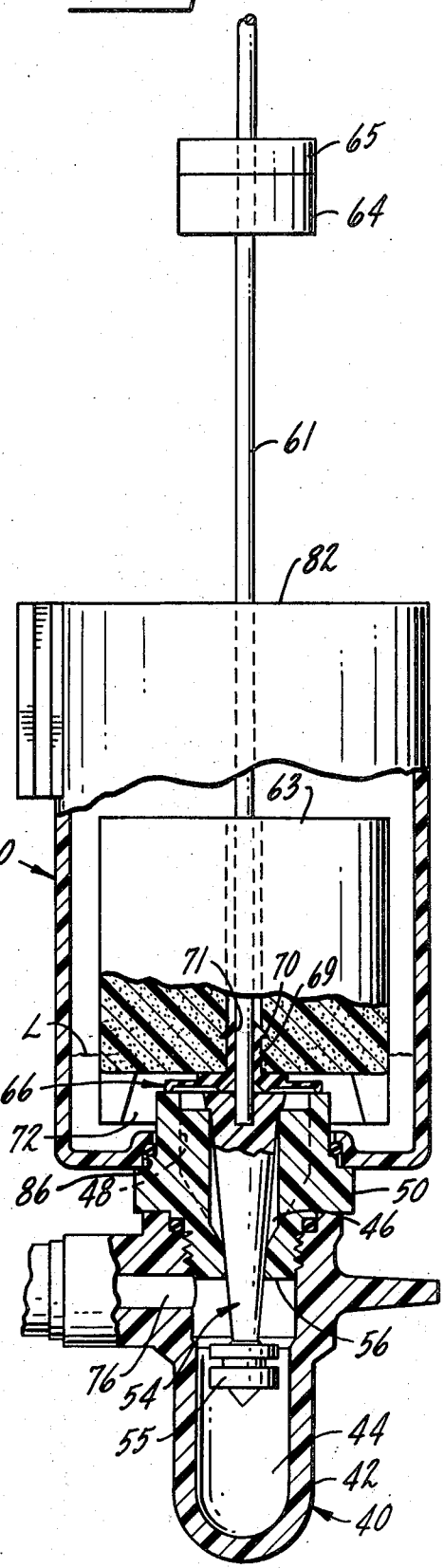

BRINE VALVE ASSEMBLY

This invention relates in general to a water conditioning system. It deals more particularly with an improved brine valve assembly for control of the brine used to regenerate the ion exchange material.

Water softening with ion exchange material such as resin particles or the like is well-known in the art. During the softening process or service cycle, the ion exchange resin particles acquire hardness-inducing ions from the water in exchange for "soft ions," or ions which do not induce hardness. After prolonged contact of the resin particles with the raw water, their ion exchange capacity is diminished considerably and regeneration of the ion particles must be accomplished. Regeneration is conventionally accomplished by contacting the resin particles with a brine solution, e.g. an aqueous solution of sodium chloride or potassium chloride or the like.

The ion exchange process and the regeneration of ion exchange material are conventionally accomplished in a resin tank, while a brine tank is employed to manufacture and store brine between regeneration cycles. When regeneration is initiated in the water conditioning by a suitable timing means-control valve arrangement, brine is drawn from the brine tank and passed through the bed of ion exchange material in the resin tank to revitalize the bed by removing hardness-inducing ions from it and replacing them with sodium ions from the brine solution.

Actually, as is well-known, the regeneration of an ion exchange resin bed in a water conditioning system normally comprises several treatment cycles in addition to brining. These might include fresh water backwash of the ion exchange bed, and, in addition, rinsing of the bed with fresh water to remove residual brine and other foreign material. It is normally during a rinsing cycle, subsequent to brining, that the brine tank water supply is replenished to create more brine for the next regeneration period. After a predetermined amount of fresh water has been introduced to the brine tank, brine tank refill is terminated and the brine system is at rest pending a signal from the timing device-control valve for another regeneration.

The present invention is more specifically an improvement upon the brine valve assembly disclosed in U.S. Pat. No. 3,126,907 to Tischler, etal., assigned to the same assignee as the present invention.

SUMMARY OF THE INVENTION

It is an object of the present invention to provide a brine valve assembly having a more positive air shut-off than heretofore used brine valves.

It is another object to provide a brine valve assembly which is adjustable to control the amount of brine drawn during each regeneration cycle.

It is still a further object of the present invention to provide a brine valve assembly which can operate within a brine tank which does not include a salt platform.

The foregoing and other objects are realized in accordance with the present invention by providing a brine valve asembly, including a float valve arrangement for closing and sealing the inlet port when a predetermined low level is reached in the brine tank. The float valve is positioned to float within a cup shaped float cage immediately prior to its sealing of the inlet port. The level of liquid within the float cage is controlled through a tube having a lower end in communication therewith and an upper end in communication with the interior of the brine tank. The elevation of the upper end is adjustable to control the amount of brine drawn during each regeneration cycle. An alternative embodiment of the invention discloses a unique float construction which uses the weight of the brine to insure a better air shut-off.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 is a schematic view of a water conditioning system incorporating the improved brine valve assembly of the present invention;

FIG. 2 is a front sectional view of a portion of a brine tank including a brine valve assembly embodying features of the present invention, the brine valve assembly being positioned for a low brine draw;

FIG. 3 is an enlarged front sectional view of a portion of the brine valve assembly illustrated in FIG. 2 showing the float valve in its high position and the lower valve closure member in its closing position, the brine valve assembly being positioned for a high brine draw;

FIG. 4 is a front sectional view of a portion of the brine valve assembly illustrated in FIG. 3 showing the float valve in its low or sealing position and the lower valve closure member in its open position;

FIG. 5 is a front sectional view of a portion of the brine valve assembly as illustrated in FIG. 4 showing an alternative embodiment of the float valve; and FIG. 6 is a top plan view of the float valve illustrated in FIG. 5.

DESCRIPTION OF PREFERRED EMBODIMENTS

Referring to FIG. 1, a water conditioning system of broadly conventional construction is illustrated schematically at 10. The system 10 is designed to soften city main water when it is delivered to a residence, for example, during a "service cycle" of the system. Periodically the system 10 is "regenerated" in a broadly conventional manner by the use of a brine solution in a regeneration cycle or cycles. As is already evident, the present invention is primarily concerned with the control of the brine during the regeneration cycle.

During the service cycle, raw or hard water from a suitable source is passed through a feed line 11 to a control valve 12. The control valve 12 directs the raw water through a line 14 to a resin tank 16 which contains a bed of the ion exchange particles. The raw water passes through the bed of particles and is withdrawn from the tank through a line 17. The treated water, which has been softened by contact with the ion exchange resin particles, passes through the line 17 to the control valve 12 once more and is directed by the control valve 12 to a service line 81.

After a predetermined quantity of raw water has passed through the resin tank 16, at a time when the ion exchange particles have begun to lose their capacity to effectively soften the raw water, regeneration is initiated by a timer 20. This regeneration conventionally includes cycles wherein the ion exchange particle bed is backwashed and rinsed. It further includes a brine cycle wherein the ion exchange particle bed is treated to flow through by a brine solution. The brine cycle is initiated by the timer 20 to actuate the control valve 12 and direct raw water from the service line 11 through a bypass line 22 to an aspirator valve 23. This raw water is returned to the control valve from the aspirator valve 23 through a return line 24 but, in passing through the aspirator valve 23, it establishes a pressure reduction by Venturi effect in a brine line 25 connected to the brine tank 26. A concentrated brine solution is drawn up through the brine line 25 from the brine tank 26 by the partial vacuum and flows with the water through the line 24 and the control valve 12 into the line 14 and resin tank 16. The brine flowing through the bed of ion exchange resin particles removes the hardness inducing ions therefrom and carries them through the line 17 and the control valve 12 to the drain line 27.

As long as there is brine available to the brine line 25 in the brine tank 26 and while a partial vacuum is maintained therein, brine treatment of the ion exchange resin bed in the resin tank 16 continues. It is desirable, of course, to have exactly the amount of brine available which will effectively regenerate a bed of ion exchange resin material which has been exhausted to a known extent. It is the brine valve assembly 30, to which the present invention is directed, which controls the amount of brine drawn from the brine tank 26.

Referring to FIGS. 1–4, the brine valve assembly 30 includes a brine well 32 extending through and supported by a foraminous, horizontal, salt-supporting platform 34 inside brine tank 26. The platform 34 extends across the brine tank 26 at a level spaced above the bottom of the tank and on it is maintained a layer of salt from which brine is formed. The brine well 32 is in communication with the brine tank 26 through a series of vertically disposed slots 36 in the lower portion of the well.

Positioned within well 32 is a brine valve 40 having a body 42 adapted to be submerged in the brine within well 32; the body 42 defining a chamber 44. From the chamber 44, a first passage 46 extends upwardly and communicates at its upper end with the interior of well 32. The passage 46 is defined by an upwardly and outwardly flaring wall portion 47 and a cylindrical upper wall portion 48 of a separable body member 50. Vertically elongated stop members 52 are formed in the body member 50 and have horizontally disposed upper ends 53 which are spaced downwardly from the upper end of the cylindrical wall portion 48 to afford a stop for downward movement of a valve stem 54.

Fixed on the lower end of the stem 54 within the chamber 44 is a lower valve closure member 55 adapted to close the passage 46 at a seat 56 surrounding the lower end of the passage. The upper end portion of the stem 54 has an integral head 57 and an annular flange 58 adapted to be supported on the upper ends of the members 52 when the stem is at the lower extremity of its movement, as indicated in detail in FIG. 4. The cylindrical wall 48 and annular flange 58 form an annular port 60 between them for flow of liquid between the body 50 and the well 32. A valve seat surrounding the upper end of the passage 46 has surfaces spaced radially inward and radially outward of the annular port 60. These surfaces comprise a plane upper surface of the flange 58 and a similar upper surface 59 of body 42. The surface 59 and the top surface of the flange 58 are plane horizontally disposed surfaces and are disposed at substantially the same elevation when the stem 54 is in its lowermost position.

A float guide rod 61 is secured at its lower end to the stem 54 in co-axial relation thereto and is guided for limited vertical movement in a bearing opening formed in a guide bracket 62. Mounted co-axially on the rod 61 is a float body 63 having a loosely fitting axial bore through which the guide rod 61 passes. Adjustably secured to the guide rod 61 above the float 63 is an upper limit stop 64 which may be constructed in whole or in part from resilient rubberlike material having an axial bore which fits snugly about the rod 61. Gravity bias of the valve stem 54 toward its lowermost position may be increased by the addition of a weight 65 to the upper side of the stop 64.

An annular float valve closure member indicated generally by the numeral 66 is mounted at the lower side of the float body 63 to close the port 60 when the float descends to its low level, as illustrated in FIG. 4. The lower face of the member 66 is formed with an outer flexible, elastic annular flange 67 and an inner annular flange 68. These flanges are disposed to close respectively on the seat surface 59 and on the upper surface of the flange 58. The flanges 67 and 68 bridge the annular port 60 when in a closed position in relation thereto, as seen in FIG. 4. Suitable means for sectioning the closure member 66 to the float body 63 may comprise an elastic hub portion 69 of the member 66 which extends vertically in a bore formed in the float body and a head member 70 formed on the hub member 69 to engage the float body on an annular shoulder formed therein. A tubular opening 71 extends axially through the member 66 and its hub portion 69 to loosely receive the guide rod 61 and thereby permit movement of float body 63 between its upper level position shown in FIG. 3 to its lower level position shown in FIG. 4. The lower side of the float body 63 is preferably formed with an annular recess 72 to receive the closure member 66 and the peripheral wall defining the recess 72 is formed with one or more notches 73 extending to the elevation of the member 66 to allow water to enter the recess 72.

In order to insure uniformity in the limitation of liquid withdrawal to a predetermined low level in the well 32, the specific gravity of the float body 63 should be so related to the specific gravity of the brine in the well 32 so as to cutoff the flow out of the well when the level reaches a predetermined low level, such as that indicated at L in FIG. 4. It is important that the flow of brine out of the well be stopped at the level L instantaneously by the sealing member 66 when the flanges 67 and 68 complete the seal under the atmospheric pressure above the closure member and sub-atmospheric pressure in the chamber 44 and passage 46.

A conduit 74 is provided to alternatively supply liquid to the valve body 42 and withdraw brine therefrom. The conduit 74 is in communication with brine line 25 at its upper end and is connected at its lower end to the chamber 44 by a passage 75 terminating at a port 76 at the chamber 44. The conduit 74 provides a support for the guide 62 of the rod 61.

An important feature of the present invention is the inclusion of a float cage 80 mounted to body 42 to receive float 63 as it approaches its low level position as shown in FIG. 4, and causes it to drop at a faster rate so as to result in a more positive air shut-off. Float cage 80 is a cup shaped member having an open top portion 82 and a closed bottom portion 84. A centrally disposed circular opening 86 in bottom portion 84 receives upper wall portion 48 therethrough in sealing relationship thereto by an O-ring 87 positioned between an annular flange 88 formed integral with bottom portion 84 and an annular step 89 formed integral with wall portion 48. Referring to FIG. 2, a flexible tube 90, positioned within well 32, has a lower end 91 in fluid communication with float cage 80 immediately above bottom portion 84 through a fitting 92. An upper end 93 of tube 90 is secured to a vertical adjusting stem 94 via fitting 95. Stem 94 has an opening 96 therethrough to permit fluid communication between well 32 and float cage 80 via flexible tube 90. Stem 94 is slidably received within a stem housing and rod retaining member 97 which in turn is secured to conduit 74. Stem 94 may be suitably calibrated with indicia to indicate the relative level of opening 96 of stem 94 through a window 98 in member 97. As will hereinafter be discussed in relation to the operation of the system 10, the amount of brine drawn may be set, according to the present invention, by adjusting the vertical position of fitting 95 within well 32.

In operation with the system 10 in its normal service cycle shortly before regeneration, the brine level in brine tank 26 and brake well 32 is at its predetermined high level as indicated at H in FIGS. 2 and 3. Lower closure member 55 is thus in contact with seat 56 and float body 63 is in its upper or highest position in contact with stop 64, as seen in FIG. 2. When the timer 20 signals the control valve 12 for regeneration of the ion exchange material in tank 16, the aspirator 23 is effective to create a suction in the conduits 25 and 74. The suction in conduit 74 creates a sub-atmospheric pressure in chamber 44 which causes the closure member 55 to be drawn down from its seat 56, oepning passage 46 for flow of brine from well 32 therethrough and then through passage 75 and conduit 74. Shortly after the withdrawal starts, the annular flange 58 on valve stem 54 seats on the stop surfaces 53, thereby stopping downward movement of the rod 61. Closure member 55 remains in its open position while the withdrawal continues and causes the float body 63 to slide down the guide rod 61 into cage 80 until the closure member 66 reaches its low level in cage 80, at which point the flanges 67 and 68 close and seal the port 60 at the annular seat surfaces surrounding this port. Thus, the predetermined low level L is established and maintained at the end of each brine withdrawal cycle. This prevents the entry of air into passage 56 through port 60.

In accordance with the present invention, the quantity of brine drawn during the brining cycle is equal to the quantity of brine contained within brine tank 26 between the high level H and either the bottom of the opening 96 in stem 94 or the top of cage 80 if at an elevation below opening 96. The quantity of brine drawn can therefore be readily controlled by adjusting the elevation of opening 96 by the sliding of stem 94 within member 97, between a high brine draw position, as shown in FIG. 3, and a low brine draw position, as shown in FIG. 2. Another important feature of the invention is that the float body 63 slowly descends during the brine withdrawal cycle until the level in cage 80 reaches the level of the bottom of opening 96; at which point the float 63 rapidly drops with the liquid level in cage 80 into a sealing position with closure member 66 covering port 60, as seen in FIG. 4. This rapid drop of float 63 causes a more positive seal of closure member 66 over port 60. It should also be noted that since tube 90 is completely confined within well 32, the system 10 could function without the use of the salt platform 34.

After the brining cycle, refill liquid is supplied to brine tank 26 through conduit 74. As the refill flow starts, the liquid pressure in the passage 46 raises the closure member 66 from its seat and allows water to pass through valve 40 freely into the cage 80, well 32, and tank 26 causing the float body 63 to rise. This refill flow continues while the float body 63 engages the upper stop 64 and then actuates the rod 61 connected to stem 54 causing stem 54 to move the lower closure member 55 to its closed position on seat 56, as indicated in FIG. 3. Complete closure of the valve 40 at the seat 56 occurs when a quantity of water to raise the level in tank 26 to the predetermined high level indicated at H has been reached. The system 10 is then ready to start its normal service cycle.

Referring to FIGS. 5 and 6, an alternative float body design is indicated at 100. Float body 100 is substantially the same as float body 63 as disclosed hereinabove with the addition of a plurality of cavities 102 formed integral therewith. Cavities 102 extend substantially the entire depth of float 100 and include vertical slots 104, removed from the outer periphery thereof, which extend approximately three-fourths the depth of cavities 102. The operation of a system 10 which includes a float body 100 is substantially the same as that discussed immediately hereinabove. The specific gravity of float body 100 is designed such that the level of brine within cavities 102 is above the lower ends of slots 104 when the float is in its up position and the level of brine within the cavities 102 is at the level of the lower ends of slots 104 when the float is in its down position. Thus, as the float body 100 descends to its down or sealing position, the weight of the brine within the cavities 102 is helpful to insure a more positive seal of port 60 by closure member 66. This float design makes it unnecessary to provide a metal weight to float.

Obviously many modifications and variations of the present invention are possible in light of the above teachings. It is, therefore, to be understood that, within the scope of the appended claims, the invention may be practiced otherwise than as specifically described without departing from the spirit and scope of the invention.

What is claimed is:

1. In a brine system for regenerating ion exchange material used for water conditioning including a brine tank, having a brine well positioned therein so as to define a brine valve compartment within said well and a brine storage compartment outside said well and means associated with the lower end of said well for permitting fluid communication between said brine valve compartment and said brine storage compartment; an improved brine valve assembly for controlling the influx of refill water to said tank and the efflux of brine from said tank, comprising:

a. a valve body having an internal chamber and an upwardly opening annular port;

b. annular seat means concentric with said annular port;
c. a vertically elongated float guide means extending above said seat means in said well;
d. a float means movable along said guide in response to changes in the level of liquid in said well;
e. a valve closure member means carried by said float means to close against said seat means for closing said annular port when the brine level descends to a predetermined low level in said well;
f. a float cage member concentric with said float guide means and positioned immediately above said valve body, said cage having a closed lower end in fluid communication with said annular port and an open upper end for receipt of said float means therethrough;
g. a tube means having a lower end in fluid communication with said lower end of said float cage member and an upper end in fluid communication with said well; and
h. a conduit means having a lower end in fluid communication with said valve body for withdrawing brine from said well and directing refill water into said well through said annular port.

2. The invention as defined in claim 1 wherein said tube means being of a flexible material so as to permit adjustment of the level of said upper end to control the brine draw through said valve assembly.

3. The invention as defined in claim 2 wherein said upper end of said tube means is secured to a substantially vertical stem means which is supported for vertical movement within said well, said stem means having an opening formed therein to permit the flow of brine therethrough into said tube means.

4. The invention as defined in claim 3 wherein said stem means is slidably received within a stem housing means having a viewing window associated therewith, said stem means having level indicia thereon which are viewable through said window.

5. The invention as defined in claim 1 wherein said float means having a plurality of cavities formed integral therewith and extending substantially the entire depth thereof for receipt of brine therein, said cavities having slots removed therefrom which have lower ends extending below the level of brine within said cavities when said float means is in an up position within said well.

* * * * *

UNITED STATES PATENT OFFICE
CERTIFICATE OF CORRECTION

Patent No. 3,844,309        Dated October 29, 1974

Inventor(s) Edward Joseph Tischler

It is certified that error appears in the above-identified patent and that said Letters Patent are hereby corrected as shown below:

In column 2, line 63 "81" should be --18--.

In column 5, line 39 "oepning" should be --opening--.

In column 5, line 53 "56" should be --46--.

Signed and sealed this 28th day of January 1975.

(SEAL)
Attest:

McCOY M. GIBSON JR.
Attesting Officer

C. MARSHALL DANN
Commissioner of Patents